(12) United States Patent
Ince et al.

(10) Patent No.: US 9,989,104 B2
(45) Date of Patent: Jun. 5, 2018

(54) WEDGE CLUTCH WITH MUTUALLY SUPPORTING WEDGE PLATES AND SELF-LOCKING DISPLACEMENT ASSEMBLY

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 232 days.

(21) Appl. No.: 15/019,556

(22) Filed: Feb. 9, 2016

(65) Prior Publication Data
US 2017/0227063 A1    Aug. 10, 2017

(51) Int. Cl.
*F16D 13/16*    (2006.01)
*F16D 15/00*    (2006.01)
*F16D 23/12*    (2006.01)

(52) U.S. Cl.
CPC ............. *F16D 13/16* (2013.01); *F16D 15/00* (2013.01); *F16D 2023/123* (2013.01)

(58) Field of Classification Search
CPC .......... F16D 13/16; F16D 13/26; F16D 15/00; F16D 2023/123
See application file for complete search history.

(56) References Cited

U.S. PATENT DOCUMENTS

| 1,040,866 | A  | * | 10/1912 | Bowen | F16D 13/16 |
|           |    |   |         |       | 192/101 |
| 2,782,893 | A  | * | 2/1957  | Chapman | F16D 13/16 |
|           |    |   |         |       | 192/105 CE |
| 9,644,690 | B2 | * | 5/2017  | Lee   | F16D 43/00 |
| 2014/0110207 | A1 |  | 4/2014  | Davis |  |
| 2015/0083539 | A1 |  | 3/2015  | Lee et al. |  |

* cited by examiner

*Primary Examiner* — Richard M Lorence

(57) ABSTRACT

A wedge clutch, including: a hub; a ring located radially outward of the hub; a wedge plate radially between the hub and the ring; and a displacement assembly including an element and an engagement arm. To transition from a disconnect mode for the wedge clutch, in which the hub and the ring are relatively rotatable, to a connect mode for the wedge clutch, the engagement arm is arranged to pivot in a first rotational direction to displace the hub in a first axial direction. To transition from the connect mode to the disconnect mode, the engagement arm is arranged to pivot in a second rotational direction, opposite the first rotational direction and the element is arranged to displace the hub in a second axial direction, opposite the first axial direction.

20 Claims, 7 Drawing Sheets

WEDGE CLUTCH WITH MUTUALLY SUPPORTING WEDGE PLATES AND SELF-LOCKING DISPLACEMENT ASSEMBLY

TECHNICAL FIELD

Described herein is a wedge clutch with a self-locking displacement assembly. In particular, the assembly is able to maintain the wedge clutch in a connect (closed) mode without the application of external force, for example by an actuator.

BACKGROUND

During a connect (closed) mode for known wedge clutches having a hub with a radially sloping surface for contacting the wedge plate, compressive forces, due to the transmission of torque through the clutch, urge the wedge plate to slip down the radially sloping surface, which tends to axially displace the hub with respect to the wedge plate and open the clutch, reducing reliability and torque-carrying capacity of the wedge clutch. An actuator can be used to apply axial force to the hub to maintain the axial position of the hub. However, the actuator must be powered by the vehicle in which the wedge clutch is located, which reduces the amount of power available for other components in the vehicle and the overall efficiency of the wedge clutch and vehicle.

SUMMARY

According to aspects illustrated herein, there is provided a wedge clutch, including: an axis of rotation; a hub; an outer ring located radially outward of the hub; a wedge plate radially disposed between the hub and the outer ring; and a displacement assembly including a first element urging the hub in a first axial direction and an engagement arm. To transition from a disconnect mode for the wedge clutch, in which the hub and the outer ring are rotatable with respect to each other, to a connect mode for the wedge clutch, in which the hub and the outer ring are non-rotatably connected, the engagement arm is arranged to pivot, with respect to an axis for the at least one engagement arm, in a first rotational direction to displace the hub in a second axial direction, opposite the first axial direction. To transition from the connect mode to the disconnect mode the engagement arm is arranged to pivot, with respect to the axis for the engagement arm, in a second rotational direction, opposite the first rotational direction and the first element is arranged to displace the hub in the first axial direction to enable rotation between the outer ring and the hub.

According to aspects illustrated herein, there is provided a wedge clutch, including: an axis of rotation; a hub; an outer ring located radially outward of the hub; a wedge plate radially disposed between the hub and the outer ring; and a displacement assembly including a resilient element urging the hub in a first axial direction, an engagement arm and a slider ring. To transition from a disconnect mode for the wedge clutch, in which the hub and the outer ring are rotatable with respect to each other, to a connect mode for the wedge clutch, in which the hub and the outer ring are rotatable with respect to each other: the slider ring is arranged to slide along the engagement arm in a first axial direction; and the engagement arm is arranged to pivot, with respect to an axis for the engagement arm, in a first rotational direction to displace the hub in a second axial direction, opposite the first axial direction. To transition from the connect mode to the disconnect mode: the slider ring is arranged to slide along the engagement arm in a second axial direction, opposite the first axial direction; the engagement arm is arranged to pivot, with respect to the axis for the engagement arm, in a second rotational direction, opposite the first rotational direction; and the first element is arranged to displace the hub in the first axial direction to enable rotation between the outer ring and hub.

According to aspects illustrated herein, there is provided a wedge clutch, including: an axis of rotation; a shaft; a hub non-rotatably connected to the shaft; an outer ring located radially outward of the hub; a wedge plate radially disposed between the hub and the outer ring; and a displacement assembly. To transition from a disconnect mode for the wedge clutch, in which the hub and the outer ring are rotatable with respect to each other, to a connect mode for the wedge clutch, in which the hub and the outer ring are non-rotatably connected, the displacement assembly is arranged to displace the, with respect to the wedge plate, in a first axial direction. In the connect mode, the displacement assembly is axially disposed between the hub and at least a portion of the shaft and directly engaged with the hub and the at least a portion of the shaft to block displacement of the hub, with respect to the shaft, in a second axial direction, opposite the first axial direction. To transition from the connect mode to the disconnect mode, the displacement assembly is arranged to displace the hub, with respect to the wedge plate, in the second axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
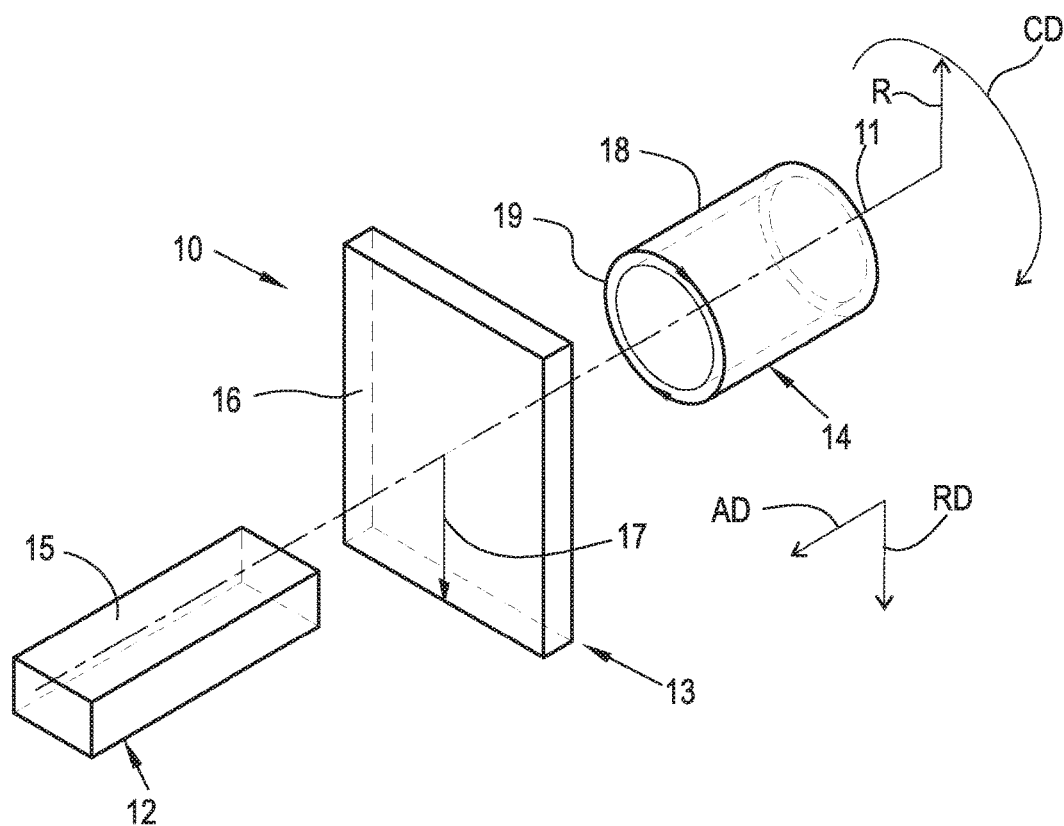
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
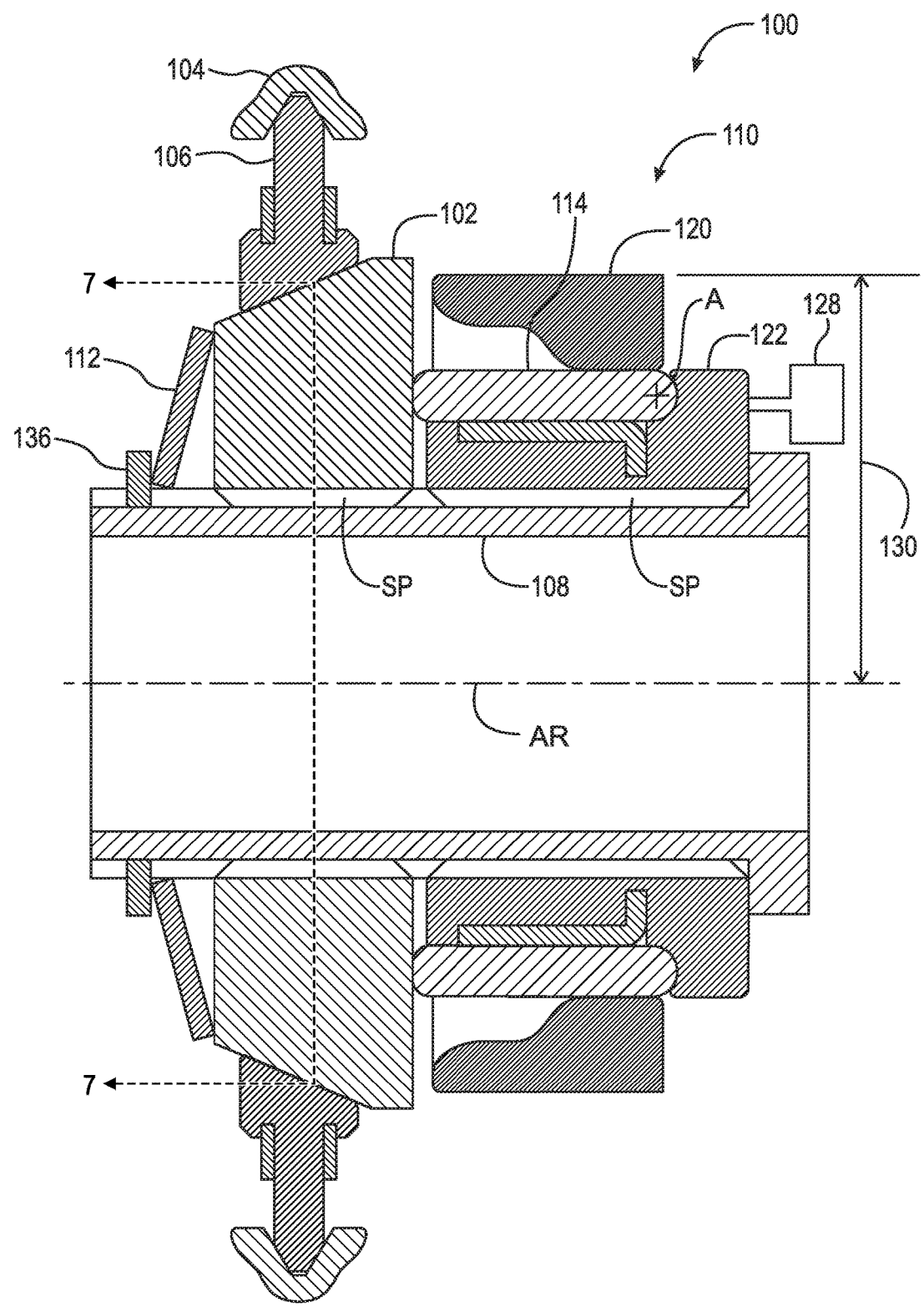
FIG. 2 is a cross-sectional view of a wedge clutch with a self-locking connect mode, in the connect mode.

FIG. 2 is a cross-sectional view of wedge clutch 100 with a self-locking connect mode, in the connect mode. Wedge clutch 100 includes: axis of rotation AR; hub 102; outer ring 104 located radially outward of hub 102; wedge plate 106; splined shaft 108; and displacement assembly 110. Wedge plate 106 is radially disposed between hub 102 and outer ring 104. In an example embodiment, assembly 110 includes element 112 urging hub 102 in axial direction AD1. In an example embodiment, element 112 is a resilient element. Assembly 110 includes engagement arm 114. Hub 102 and at least portions of assembly 110 are non-rotatably connected to shaft 108, for example by splines SP. By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 3:
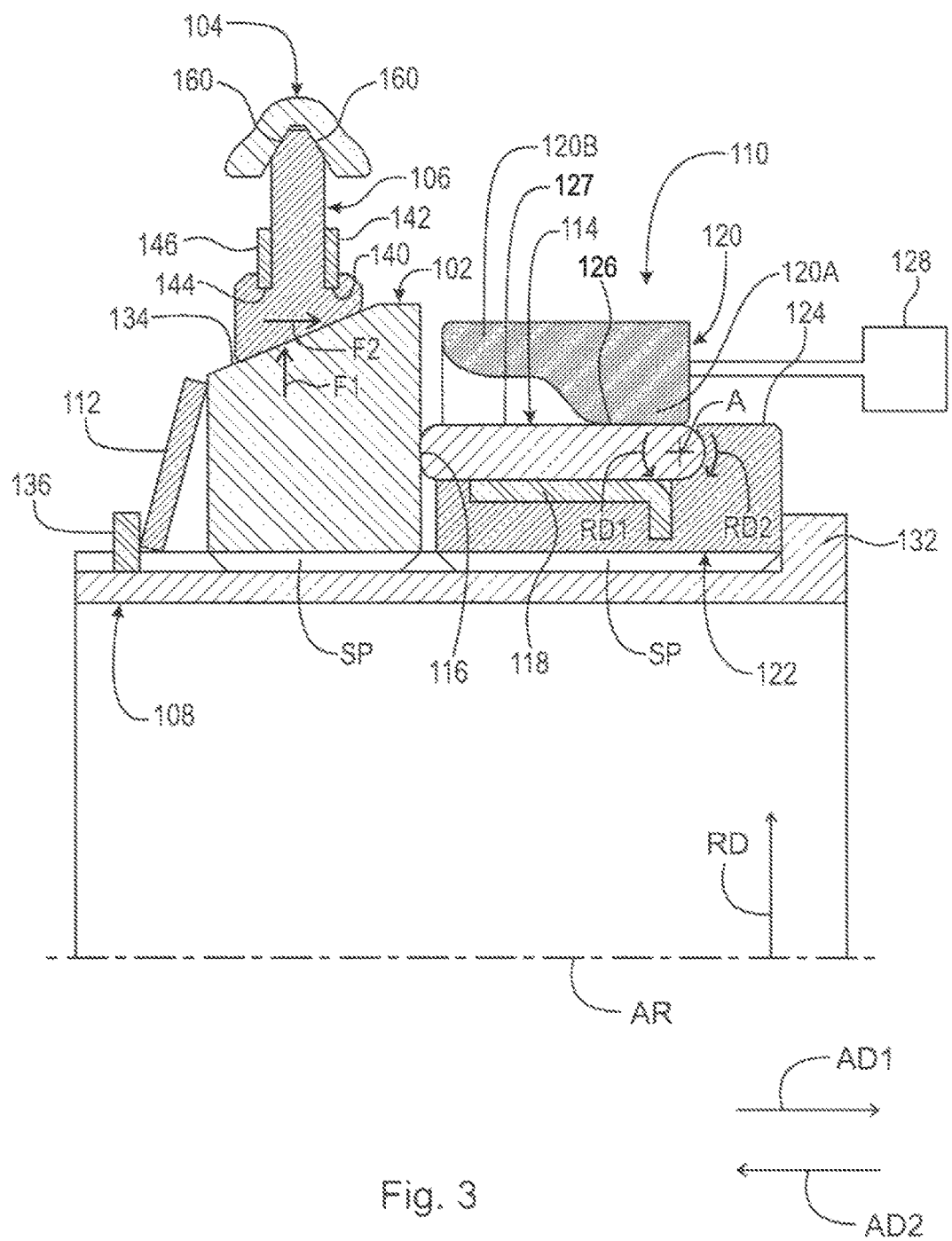
FIG. 3 is a partial cross-sectional view of the wedge clutch in FIG. 2.

FIG. 3 is a partial cross-sectional view of wedge clutch 100 in FIG. 2.

Figure 4:
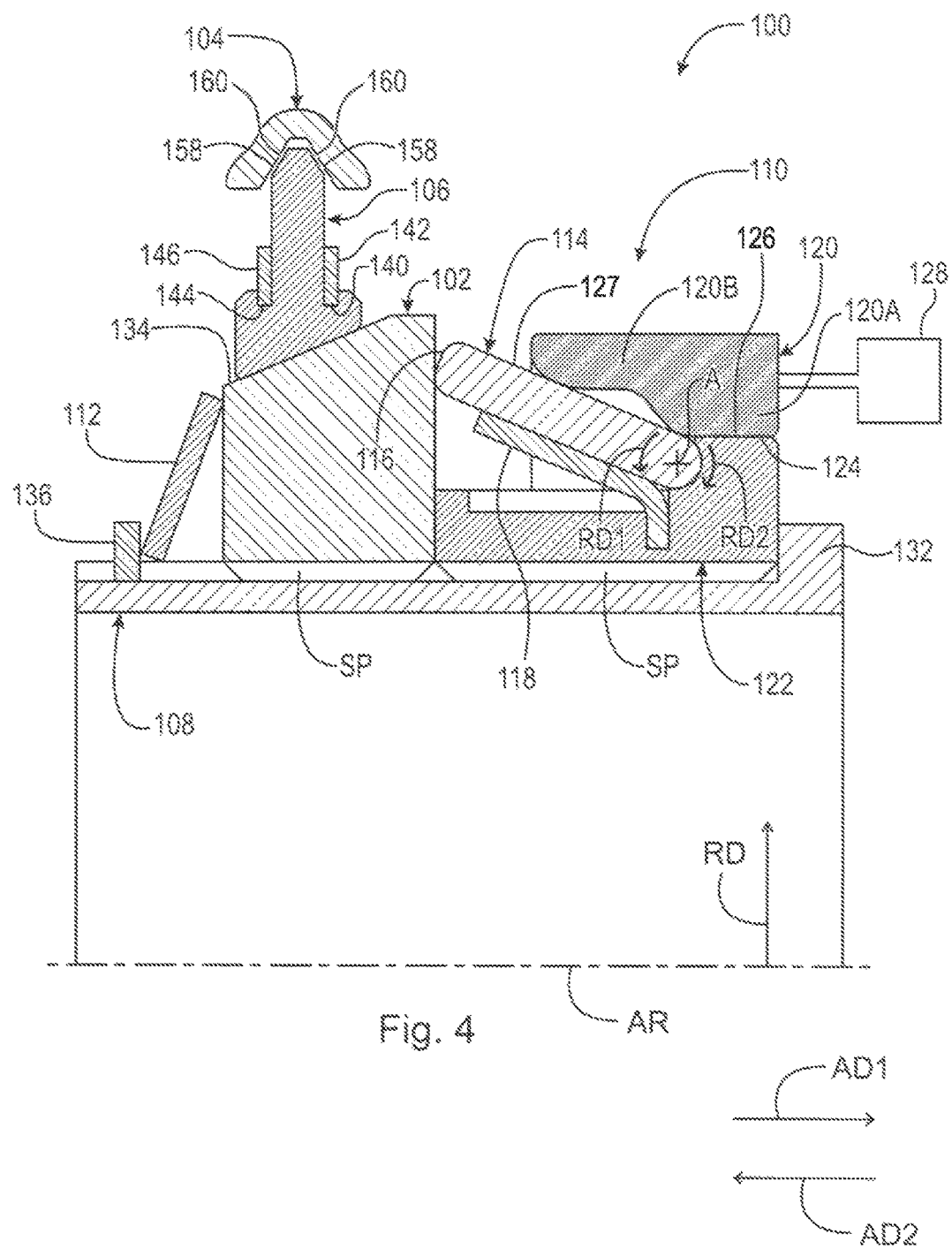
FIG. 4 is a partial cross-sectional view of the wedge clutch in FIG. 2 in a disconnect mode.

FIG. 4 is a partial cross-sectional view of wedge clutch 100 in FIG. 2 in a disconnect mode. The following should be viewed in light of FIGS. 2 through 4. To transition from a disconnect mode for wedge clutch 100, in which hub 102 and outer ring 104 are rotatable with respect to each other, to a connect mode for wedge clutch 100, in which hub 102 and ring 104 are non-rotatably connected, engagement arm 114 is arranged to pivot, with respect to axis A for engagement arm 114, in rotational direction RD1 to displace hub 102 in axial direction AD2, opposite axial direction AD1. To transition from the connect mode to the disconnect mode: engagement arm 114 is arranged to pivot, with respect to axis A, in a rotational direction RD2, opposite rotational direction RD1; and element 112 is arranged to displace hub 102, with respect to plate 106 and shaft 108, in axial direction AD1.

Engagement arm 114 includes distal end 116 directly engaged with, for example in contact with, hub 102. To transition from the disconnect mode to the connect mode, engagement arm 114 is arranged to pivot, or rotate (hereinafter, the terms "pivot" and "rotate" are used interchangeably), distal end 116 in direction RD1, radially toward axis of rotation AR. To transition from the connect mode to the disconnect mode, engagement arm 114 is arranged to pivot distal end 116 in rotational direction RD2, radially away from axis of rotation AR.

In an example embodiment, assembly 110 includes: arm spring 118 urging arm 114 in rotational direction RD2; and slider ring 120 in contact with engagement arm 114. To transition from the disconnect mode to the connect mode, slider ring 120 is arranged to: slide along engagement arm 114 in axial direction AD2; and pivot engagement arm 114 in the rotational direction RD1. Thus, engagement arm 114 in compressive engagement with slider ring 120. To transition from the connect mode to the disconnect mode, slider ring 120 is arranged to: slide along engagement arm 114 in axial direction AD1; and arm spring 118 is arranged to pivot arm 114 in direction RD2.

In an example embodiment, displacement assembly 110 includes support block 122 and engagement arm 114 is pivotably connected to support block 122. For example, axis A passes through block 122. Block 122 is non-rotatably connected to shaft 108. Arm spring 118 reacts against support block 122 to urge arm 114 in rotational direction RD2. Slider ring 120 is radially outward of support block 122. To transition between the connect mode and the disconnect mode, slider ring 120 is arranged to slide along support block 122, for example along surface 124 of block 122 and along engagement arm 114, for example along surface 127. Once in the connect mode, contact between arm 114 and slider ring 120 prevents arm 114 from rotating in direction RD2, thus keeping wedge clutch 100 in the connect mode.

In an example embodiment, to transition from the disconnect mode to the connect mode, slider ring 120 is arranged to: slide along engagement arm 114 in axial direction AD2, for example along surface 127 of arm 114; and pivot engagement arm 114 in rotational direction RD1. In an example embodiment, to transition from the connect mode to the disconnect mode: slider ring 120 is arranged to slide along engagement arm 114 in axial direction AD1, for example along surface 127; and arm spring 118 is arranged to pivot engagement arm 114 in rotational direction RD2.

In an example embodiment, slider ring 120 includes portion 120A and portion 120B radially outward of portion 120A. In the disconnect mode, portions 120A and 120B are in contact with engagement arm 114. In an example embodiment, in the connect mode, engagement arm 114 is free of contact with portion 120B.

In an example embodiment, assembly includes actuator 128. To transition from the disconnect mode to the connect mode: actuator 128 is arranged to displace slider ring 120 in axial direction AD2; slider ring 120 is arranged to slide across arm 114 in direction AD2; slider ring 120 is arranged to pivot arm 114 in direction RD1; arm 114 is arranged to displace hub 102, with respect to plate 106 and shaft 108, in direction AD2; and as further described below, hub 102 is arranged to displace wedge plate 106 radially outward. Once in the connect mode, assembly 110 is self-locking, without the use of actuator 128, as further described below.

Slider ring 120 is radially fixed with respect to axis AR and arm 114. That is, distance 130 from axis AR to slider ring 120 is fixed. Thus, in the connect mode, since slider ring 120 is radially fixed, arm 114 cannot rotate in direction RD2 to transition out of the connect mode. In an example embodiment, slider ring 120 is continuous in a circumferential direction. In an example embodiment, at least two portions of slider ring 120 are separated by 180 degrees about axis AR as shown in FIG. 2 and slider ring 120 is not necessarily continuous in the circumferential direction. In an example embodiment, in the connect mode, engagement arm 114 is parallel to axis of rotation AR.

In an example embodiment, shaft 108 includes axial stop 132. Axial stop 132 blocks axial displacement of support block 122 in axial direction AD1. Force F1, for example created by torque applied to hub 102, results in force F2, due to contact between wedge plate 106 and sloped surface 134 of hub 102, which urges hub 102 in direction AD1. However, since arm 114 and block 122 are axially displaced between and in contact with hub 102 and stop 132, block 122 and arm 114 cannot displace further in direction AD1, with respect to shaft 108 and plate 106, preventing wedge clutch 100 from transitioning to the disconnect mode. Thus, contact between arm 114 and slider ring 120 and contact between hubs 102 and 108 and assembly 110 keeps arm 114 in the position shown in FIGS. 2 and 3, without the use of actuator 128. That is, once clutch 100 is in the connect mode, actuator 128 can be de-energized. In an example embodiment, snap ring 136 engages shaft 108 to axially restrain element 112 in axial direction AD2.

Figure 5:
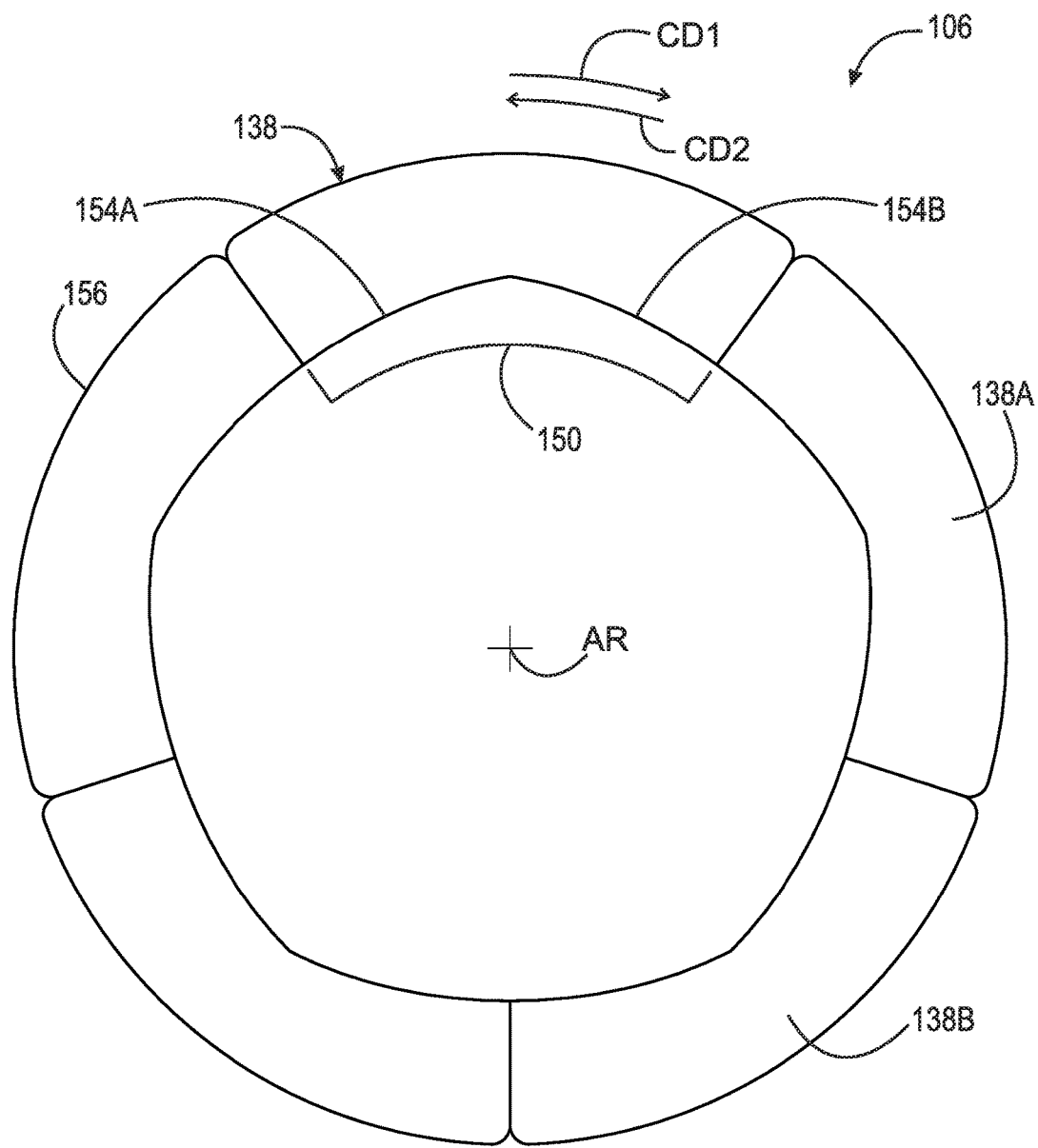
FIG. 5 is a front view of the wedge plate in FIG. 2.

FIG. 5 is a front view of wedge plate 106 in FIG. 2.

Figure 6:
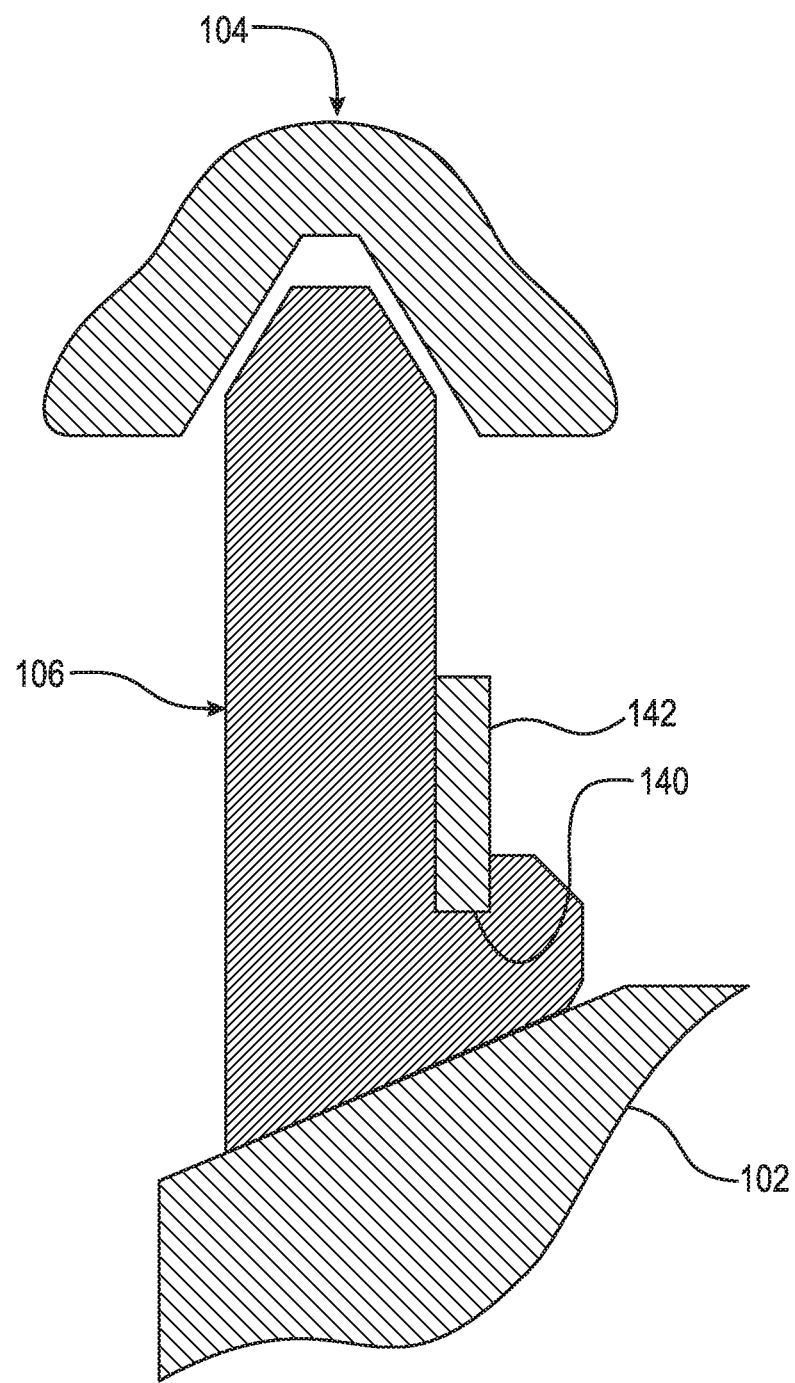
FIG. 6 is a cross-sectional view of an example embodiment of a wedge plate for the wedge clutch in FIG. 2; and, FIG. 7 is a cross-sectional view generally along line 7-7 in FIG. 2.

FIG. 6 is a cross-sectional view of an example embodiment of a wedge plate for the wedge clutch in FIG. 2. The following should be viewed in light of FIGS. 2 through 6. In an example embodiment, wedge plate 106 includes segments 138. Each segment 138 is separately formed from the remaining segments 138. That is, each segment 138 is a separate distinct piece. Each segment 138 includes circumferentially extending groove 140; and wedge clutch 100 includes annular resilient element (ring) 142 disposed in grooves 140 and urging segments 138 radially inward into contact with hub 102. In an example embodiment: each segment 138 includes a respective circumferentially extending groove 144; and wedge clutch 100 includes annular resilient element (ring) 146 disposed in grooves 144 and urging segments 138 radially inward into contact with hub 102.

Segments 138 include circumferentially adjacent segments, for example, segments 138A and 138B. For example, to transition from the disconnect mode to the connect mode: segments 138A and 138B are arranged to displace radially outward and away from each other in direction CD1 or CD2. For example, to transition from the connect mode to the disconnect mode: segments 138A and 138B are arranged to displace radially inward and toward each other in direction CD1 or CD2.

In an example embodiment, in the disconnect mode: at least one segment 138 is in contact with a circumferentially adjacent segment 138. In an example embodiment, in the connect mode: at least one segment 138 is free of contact with a circumferentially adjacent segment 138.

Figure 7:
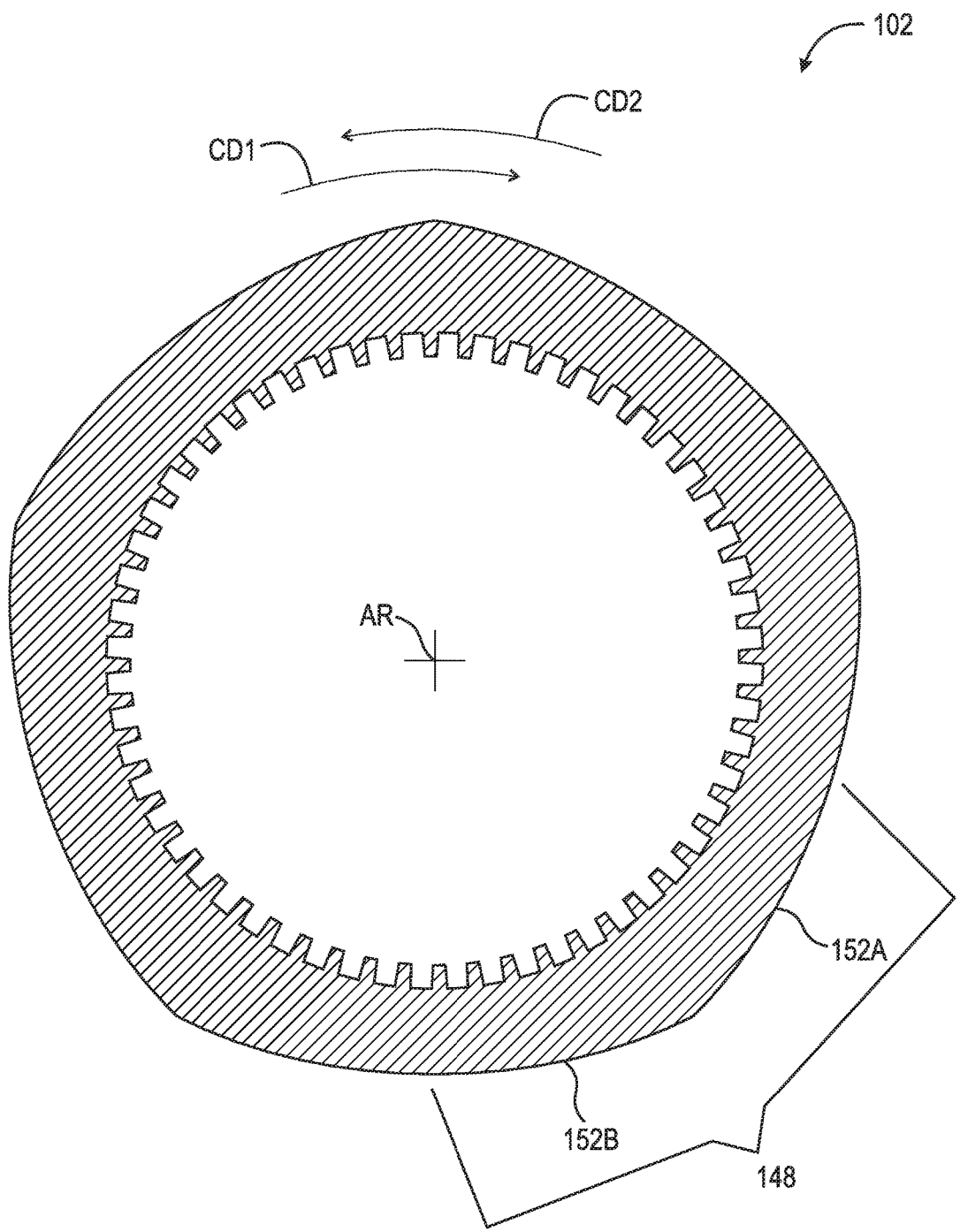

FIG. 7 is a cross-sectional view generally along line 7-7 in FIG. 2. The following should be viewed in light of FIG. 2 through 7. In an example embodiment: hub 102 includes ramps, for example, ramp pairs 148; and wedge plate 106 includes ramps, for example ramp pairs 150. Each ramp pair 148 includes ramp 152A extending radially outward in circumferential direction CD1 and ramp 152B extending radially outward in circumferential direction CD2. Each ramp pair 150 includes ramp 154A extending radially outward in circumferential direction CD1 and ramp 154B extending radially outward in circumferential direction CD2. Each ramp 152A is engaged with a respective ramp 154A. Each ramp 152B is engaged with a respective ramp 154B.

The following provides further detail regarding the structure and function of wedge clutch 100. Note that torque can be applied to either hub 102 for transmission to ring 104 or to ring 104 for transmission to hub 102. For example, to transition from the disconnect mode to the connect mode: torque is applied to hub 102 in direction CD1; actuator 128 displaces slider ring 120 in direction AD2; slider ring 120 pivots arm 114 in direction RD1; and distal end 116 displaces hub 102 in axial direction AD2. As hub 102 displaces in direction AD2, wedge plate 106 slides radially outwardly along surface 134. Outer circumferential surfaces 156 of segments 138 frictionally engage inner circumferential surface 158 of ring 104. Hub 102 and wedge plate 106 are rotating relative to ring 104 in direction CD1. Therefore, the frictional engagement of plate 106 with ring 104 causes plate 106 to rotate with respect to hub 102, causing ramps 154A to slide radially outwardly (slide up or climb) along ramps 152A, which in turn causes wedge plate 106 to expand radially outward and non-rotatably connect to hub 102 and ring 104.

To transition from the connect mode to the disconnect mode: torque is released from hub 102; actuator 128 displaces slider ring 120 in direction AD1; spring 118 pivots arm 114 in direction RD2; and element 112 displaces hub 102 in axial direction AD1. Wedge plates 106 slides down surface 134, creating gaps 160. That is, pairs 150 slide down pairs 148. Since there is no contact between wedge plate 106 and ring 104, ring 104 and hub 102 are able to rotate independently of each other.

The discussion for torque applied in direction CD1 is applicable to torque applied in direction CD2. For example, to transition from the disconnect mode to the connect mode: torque is applied to hub 102 in direction CD2; actuator 128 displaces slider ring 120 in direction AD2; slider ring 120 pivots arm 114 in direction RD1; and distal end 116 displaces hub 102 in axial direction AD2. As hub 102 displaces in direction AD2, wedge plate 106 slides radially outwardly along surface 134. Outer circumferential surfaces 156 of segments 138 frictionally engage inner circumferential surface 158 of ring 104. Hub 102 and wedge plate 106 are rotating relative to ring 104 in direction CD2. Therefore, the frictional engagement of plate 106 with ring 104 causes plate 106 to rotate with respect to hub 102, causing ramps 154B to slide radially outwardly (slide up or climb) along ramps 152B, which in turn causes wedge plate 106 to expand radially outward and non-rotatably connect to hub 102 and ring 104.

To transition from the connect mode to the disconnect mode: torque is released from hub 102; actuator 128 displaces slider ring 120 in direction AD1; spring 118 pivots arm 114 in direction RD2; and element 112 displaces hub 102 in axial direction AD1. Wedge plates 106 slides down surface 134, creating gaps 160 between surfaces 156 and 158. That is, pairs 150 slide down pairs 148. Since there is no contact between wedge plate 106 and ring 104, ring 104 and hub 102 are able to rotate independently of each other.

Note that the above discussion regarding application of torque to hub 102 is applicable to application of torque to ring 104.

In an example embodiment, wedge clutch 100 includes a plurality of arms 114, for example as shown in FIG. 2. It should be understood that clutch 100 is not limited to any particular number of arms 114 or any particular circumferential configuration of arms 114. Multiple arms 114 stabilize slider ring 120 during the connect mode, since the radially outward force applied by multiple arms 114 on slider ring 120 cancel each other.

Advantageously, wedge clutch 100 resolves the problem noted above of preventing a wedge clutch from slipping from a connect mode to a disconnect mode or of preventing a wedge clutch from slipping in the connect mode to reduce the torque-carrying capacity of the clutch. In particular, the axial and radial disposition of slider ring 120 with respect to arm 114 and the axially positioning of arm 114 and block 122 between hub 102 and stop 132, hold arm 114 in place for the connect mode without the use of force from actuator 128. Thus, in the connect mode, actuator 128 can be deactivated once slider ring 120 has fully pivoted arm 114 in direction RD2. Therefore, hub 102 is prevented from displacing in direction AD1 in the connect mode, which eliminates undesired opening of clutch 100 and loss of torque-carrying capacity for clutch 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising:
an axis of rotation;
a hub;
an outer ring located radially outward of the hub;
a wedge plate radially disposed between the hub and the outer ring; and,
a displacement assembly including:
a first element urging the hub in a first axial direction; and,
an engagement arm, wherein:
to transition from a disconnect mode for the wedge clutch, in which the hub and the outer ring are rotatable with respect to each other, to a connect mode for the wedge clutch, in which the hub and the outer ring are non-rotatably connected, the engagement arm is arranged to pivot, with respect to an axis for the at least one engagement arm, in a first rotational direction to displace the hub in a second axial direction, opposite the first axial direction; and,
to transition from the connect mode to the disconnect mode:
the engagement arm is arranged to pivot, with respect to the axis for the engagement arm, in a second rotational direction, opposite the first rotational direction; and,
the first element is arranged to displace the hub in the first axial direction.

2. The wedge clutch of claim 1, wherein:
the engagement arm includes a distal end directly engaged with the hub;
to transition from the disconnect mode to the connect mode, the engagement arm is arranged to pivot the distal end in the first rotational direction, radially toward the axis of rotation; and,
to transition from the connect mode to the disconnect mode, the engagement arm is arranged to pivot the distal end in the second rotational direction, radially away from the axis of rotation.

3. The wedge clutch of claim 2, wherein:
the displacement assembly includes a slider ring in contact with the engagement arm;
to transition from the disconnect mode to the connect mode, the slider ring is arranged to:
slide along the engagement arm in the second axial direction; and,
pivot the engagement arm in the first rotational direction; and,
in the connect mode, the slider ring is arranged to block rotation of the engagement arm in the second rotational direction.

4. The wedge clutch of claim 3, wherein:
the displacement assembly includes an arm spring; and,
to transition from the connect mode to the disconnect mode:
the slider ring is arranged to slide along the engagement arm in the first axial direction; and,
the arm spring is arranged to pivot the distal end in the second rotational direction.

5. The wedge clutch of claim 3, wherein:
the displacement assembly includes a support block and an arm spring;
the engagement arm is pivotably connected to the support block; and,
the arm spring reacts against the support block to urge the distal end in the second rotational direction.

6. The wedge clutch of claim 5, further comprising:
a shaft, wherein:
the hub and the support block are non-rotatably connected to the shaft; and,
contact between the support block and the shaft blocks displacement of the support block in the first axial direction.

7. The wedge clutch of claim 5, wherein:
the slider ring is radially outward of the support block; and,
to transition between the connect mode and the disconnect mode, the slider ring is arranged to slide axially along the support block.

8. The wedge clutch of claim 1, wherein:
the displacement assembly includes:
an arm spring urging the engagement arm in the second rotational direction; and, a slider ring in contact with the engagement arm;
to transition from the disconnect mode to the connect mode, the slider ring is arranged to:
  slide along the engagement arm in the second axial direction; and,
  pivot the engagement arm in the first rotational direction; and,
to transition from the connect mode to the disconnect mode:
  the slider ring is arranged to slide along the engagement arm in the first axial direction; and,
  the arm spring is arranged to pivot the engagement arm in the second rotational direction.

9. The wedge clutch of claim 8, wherein in the connect mode, contact between the engagement arm and the slider ring is arranged to prevent rotation of the engagement arm in the second rotational direction.

10. The wedge clutch of claim 8, wherein the slider ring is radially fixed with respect to the axis of rotation.

11. The wedge clutch of claim 8, wherein:
the slider ring includes:
  a first portion; and,
  a second portion radially outward of the first portion;
in the disconnect mode, the first and second portions are in contact with the engagement arm; and,
in the connect mode, the engagement arm is free of contact with the second portion.

12. The wedge clutch of claim 8, wherein:
the displacement assembly includes an actuator;
to transition from the disconnect mode to the connect mode, the actuator is arranged to displace the slider ring in the second axial direction; and,
to transition from the connect mode to the disconnect mode, the actuator is arranged to displace the slider ring in the first axial direction.

13. The wedge clutch of claim 1, wherein the first element is a resilient element.

14. The wedge clutch of claim 1, wherein:
the wedge plate includes a plurality of segments, each segment in the plurality of segments separately formed from remaining segments in the plurality of segments;
each segment in the plurality of segments includes a respective circumferentially extending groove, the wedge clutch further comprising:
  an annular resilient element disposed in the respective circumferentially extending grooves and urging the plurality of segments radially inward.

15. The wedge clutch of claim 14, wherein:
each segment in the plurality of segments includes a respective first plurality of ramps;
the hub includes a second plurality of ramps engaged with the respective first pluralities of ramps; and,
to transition from the disconnect mode to the connect mode, the respective first pluralities of ramps are arranged to slide radially outwardly along the second plurality of ramps, in a first circumferential direction.

16. A wedge clutch, comprising:
an axis of rotation;
a hub;
an outer ring located radially outward of the hub;
a wedge plate radially disposed between the hub and the outer ring; and,
a displacement assembly including:
  a resilient element urging the hub in a first axial direction;
  an engagement arm; and,
  a slider ring, wherein:
  to transition from a disconnect mode for the wedge clutch, in which the hub and the outer ring are rotatable with respect to each other, to a connect mode for the wedge clutch, in which the hub and the outer ring are non-rotatably connected:
    the slider ring is arranged to slide along the engagement arm in a second axial direction, opposite the first axial direction;
    the engagement arm is arranged to pivot, with respect to an axis for the engagement arm, in a first rotational direction to displace the hub in the second axial direction; and,
  to transition from the connect mode to the disconnect mode:
    the slider ring is arranged to slide along the engagement arm in the first axial direction;
    the engagement arm is arranged to pivot, with respect to the axis for the engagement arm, in a second rotational direction, opposite the first rotational direction; and,
    the resilient element is arranged to displace the hub in the first axial direction.

17. The wedge clutch of claim 16, wherein:
the displacement assembly includes an arm spring urging the engagement arm in the second rotational direction; and,
to transition from the connect mode to the disconnect mode, the arm spring is arranged to pivot the engagement arm in the second rotational direction.

18. The wedge clutch of claim 16, wherein in the connect mode, the slider ring is arranged to block rotation of the engagement arm in the second rotational direction.

19. A wedge clutch, comprising:
an axis of rotation;
a shaft;
a hub non-rotatably connected to the shaft;
an outer ring located radially outward of the hub;
a wedge plate radially disposed between the hub and the outer ring; and,
a displacement assembly, wherein:
  to transition from a disconnect mode for the wedge clutch, in which the hub and the outer ring are rotatable with respect to each other, to a connect mode for the wedge clutch, in which the hub and the outer ring are non-rotatably connected, the displacement assembly is arranged to displace the hub, with respect to the wedge plate, in a first axial direction;
  in the connect mode, the displacement assembly is axially disposed between the hub and a portion of the shaft and is directly engaged with the hub and the portion of the shaft to block displacement of the hub, with respect to the shaft, in a second axial direction, opposite the first axial direction; and,
  to transition from the connect mode to the disconnect mode, the displacement assembly is arranged to displace the hub, with respect to the wedge plate, in the second axial direction.

20. The wedge clutch of claim 19, wherein:
the displacement assembly includes:
  a resilient element;
  a slider ring;
  an actuator; and,
  an engagement arm;
to transition from the disconnect mode to the connect mode:
  the actuator is arranged to displace the slider ring along the engagement arm in the first axial direction; and, the engagement arm is arranged to pivot in a first rotational direction to displace the hub in the first axial direction; and, to transition from the connect mode to the disconnect mode:

the actuator is arranged to displace the slider ring along the engagement arm in the second axial direction;

the engagement arm is arranged to pivot in a second rotational direction, opposite the first rotational direction; and, the resilient element is arranged to displace the hub in the second axial direction.

\* \* \* \* \*